United States Patent
Gottin et al.

(10) Patent No.: US 12,518,220 B2
(45) Date of Patent: Jan. 6, 2026

(54) EDGE-WEIGHTED QUANTIZATION FOR FEDERATED LEARNING

(71) Applicant: Dell Products L.P., Round Rock, TX (US)

(72) Inventors: Vinicius Gottin, Rio de Janeiro (BR); Pablo Nascimento da Silva, Niterói (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 778 days.

(21) Appl. No.: 17/869,998

(22) Filed: Jul. 21, 2022

(65) Prior Publication Data

US 2024/0028974 A1    Jan. 25, 2024

(51) Int. Cl.
*G06N 20/20* (2019.01)
*G06F 11/34* (2006.01)

(52) U.S. Cl.
CPC ......... *G06N 20/20* (2019.01); *G06F 11/3495* (2013.01)

(58) Field of Classification Search
CPC .................. G06N 20/20; G06F 11/3495
See application file for complete search history.

(56) References Cited

FOREIGN PATENT DOCUMENTS

CN          113315604 A  *  8/2021  ............. G06N 20/00

OTHER PUBLICATIONS

Wang, Su, Mengyuan Lee, Seyyedali Hosseinalipour, Roberto Morabito, Mung Chiang, and Christopher G. Brinton. "Device Sampling for Heterogeneous Federated Learning: Theory, Algorithms, and Implementation." arXiv e-prints (2021): arXiv-2101. (Year: 2021).*

* cited by examiner

*Primary Examiner* — Casey R. Garner
(74) *Attorney, Agent, or Firm* — Krishnendu Gupta; Derek Lam

(57) ABSTRACT

Techniques are disclosed for dynamic edge-weighted quantization. For example, a system can include at least one processing device including a processor coupled to a memory, the at least one processing device being configured to implement the following steps: selecting edge nodes for sampling based on an edge node sampling algorithm configured to use a specified number of edge nodes to be sampled; causing the selected edge nodes to execute a quantization selection procedure; receiving, from the selected edge nodes, identifications of a quantization procedure based on the quantization selection procedure; and selecting a quantization procedure for each edge node, based on the identifications of the quantization procedures for the selected edge nodes.

17 Claims, 12 Drawing Sheets

EDGE-WEIGHTED QUANTIZATION FOR FEDERATED LEARNING

REFERENCE TO RELATED APPLICATIONS

This application is related to U.S. patent application Ser. No. 17/814,055, entitled EFFICIENT SAMPLING OF EDGE-WEIGHTED QUANTIZATION FOR FEDERATED LEARNING, and filed the same day herewith. The contents of the aforementioned application are incorporated herein in their entirety.

FIELD

Embodiments disclosed herein generally relate to federated learning processes. More particularly, at least some embodiments of the invention relate to systems, hardware, software, computer-readable media, and methods for dynamically selecting edge nodes to be used in the identification and assessment of quantization processes for convergence performance.

BACKGROUND

A goal of federated learning (FL) is to train a centralized global model while the training data remains distributed on many client nodes. In practice, updating the central model involves frequently sending from the workers each gradient update, which implies large bandwidth requirements for huge models. One way of dealing with this problem is compressing the gradients sent from the client to the central node. Even though gradient compression may reduce the network bandwidth necessary to train a model, gradient compression also has the attendant problem that it decreases the convergence rate of the algorithm, that is, of the model.

There may be cases where the non-quantized, non-compressed updates could result in a sufficiently faster convergence rate to justify the higher communication costs. However, the development of methods for intelligently compressing gradients is desirable for FL applications. Particularly when it can be done by deciding when to send a compressed gradient and when to send an uncompressed gradient while maintaining an acceptable convergence rate and accuracy.

BRIEF SUMMARY

In one embodiment, a system includes at least one processing device including a processor coupled to a memory. The system also includes the at least one processing device being configured to implement the following steps: selecting edge nodes for sampling based on an edge node sampling algorithm configured to use a specified number of edge nodes to be sampled; causing the selected edge nodes to execute a quantization selection procedure; receiving, from the selected edge nodes, identifications of a quantization procedure based on the quantization selection procedure; and selecting a quantization procedure for each edge node, based on the identifications of the quantization procedures for the selected edge nodes.

In some embodiments, the at least one processing device may be further configured to cause each edge node to execute the selected quantization procedure. In addition, the quantization selection procedure may be configured to identify the quantization procedure that meets one or more established parameters. In addition, the quantization procedure may be operable to quantize a gradient generated by one of the edge nodes. In addition, the gradient may include information about performance of a federated learning process at one of the edge nodes. In addition, quantization of the gradient may include compression of the gradient. In addition, the at least one processing device may be a central node configured to communicate with the edge nodes. In addition, the edge nodes are randomly sampled.

Other example embodiments include, without limitation, apparatus, systems, methods, and computer program products comprising processor-readable storage media.

Other technical features may be readily apparent to one skilled in the art from the following figures, description, and claims.

BRIEF DESCRIPTION OF THE SEVERAL VIEWS OF THE DRAWINGS

The foregoing summary, as well as the following detailed description of exemplary embodiments of the invention, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings.

DETAILED DESCRIPTION

Figure 1:
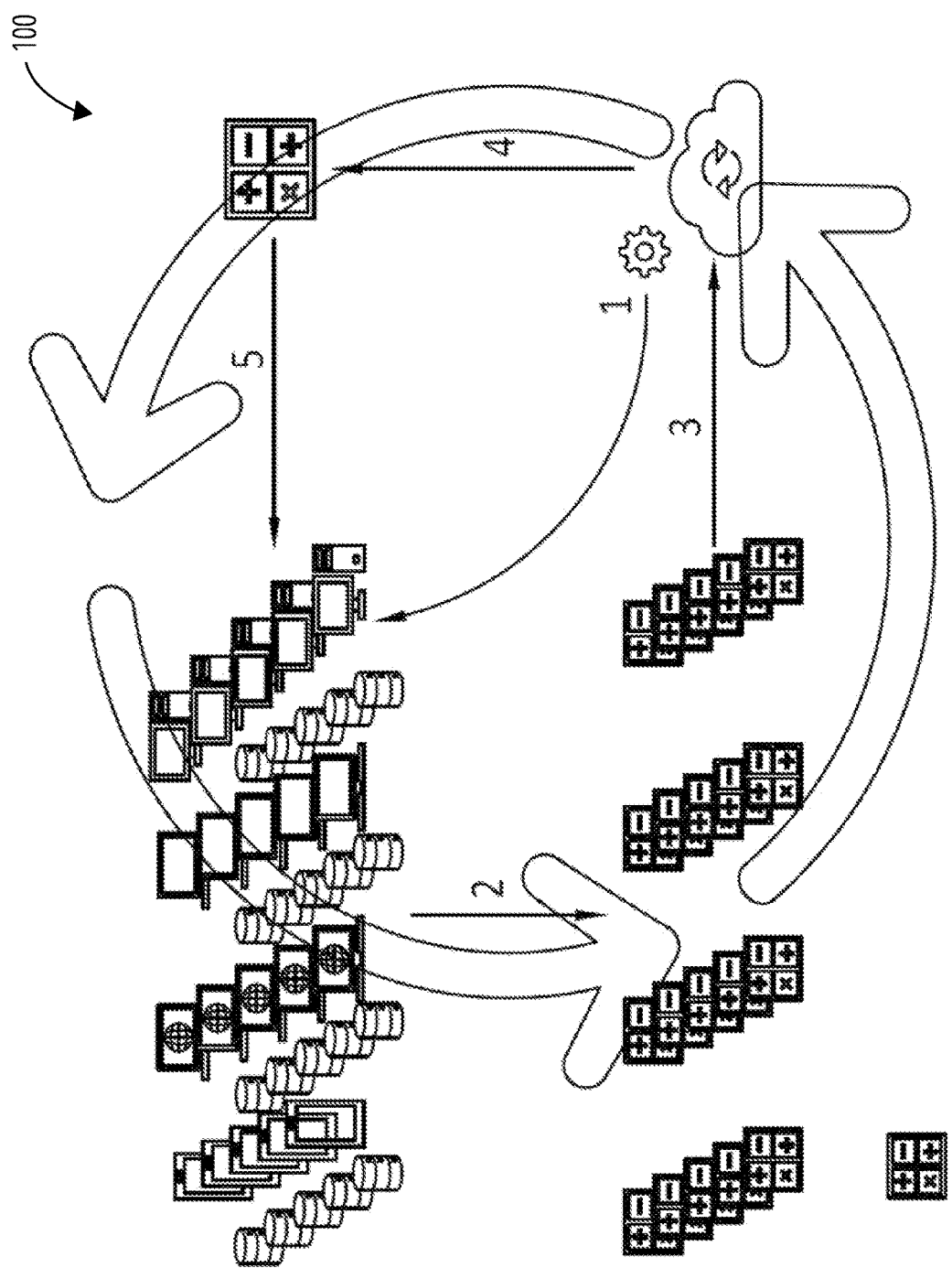
FIG. 1 illustrates aspects of an example federated learning setting.

Embodiments of the present invention generally relate to federated learning processes. More particularly, at least some embodiments of the invention relate to systems, hardware, software, computer-readable media, and methods for dynamically selecting edge nodes to be used in the identification and assessment of quantization processes for convergence performance.

In general, at least some example embodiments of the invention embrace processes to intelligently select the quantization method by using edge nodes where the quantization selection procedure will run. As used herein, 'quantization' includes, but is not limited to, a process for mapping the values in a large set of values to the values in a smaller set of values. One example of quantization is data compression, in which a size of a dataset is reduced, in some way, to create a smaller dataset that corresponds to the larger dataset, but the scope of the invention is not limited to data compression as a quantization approach.

Some particular embodiments provide for training federated learning models with a dynamic selection of gradient compression at the central node, based on an edge-side assessment of the estimated convergence rate at selected edge nodes. The determination may occur at the central node and may not incur any additional processing overhead for the edge nodes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may implement training federated learning models using dynamic selection of one or more edge nodes best suited to run a quantization selection procedure. Various other advantages of example embodiments will be apparent from this disclosure.

A. Overview

Federated Learning is a machine learning technique capable of providing model training from distributed devices while keeping their data private. This can be of great value to a business since embodiments may train machine learning models for a variety of distributed edge devices and easily apply them to various products such as, for example, laptops, servers, and storage arrays.

A goal of federated learning is to train a centralized global model while the training data for the global model remains distributed on many client nodes, which may take the form of edge nodes, for example. In this context, embodiments may assume that the central node can be any machine with reasonable computational power. Training a model in an FL setting may be done as follows. First, the central node may share an initial model, such as a deep neural network, with all the distributed edge nodes. Next, the edge nodes may train their respective models using their own data, and without sharing their data with other edge nodes. Then, after this operation, the central node receives the updated models from the edge nodes and aggregates those updated models into a single central model. The central node may then communicate the new model to the edge nodes, and the process may repeat for multiple iterations until it reaches convergence, that is, the configuration of the model has converged to a particular form.

In practice, updating the central model may involve frequently sending from the workers each gradient update, which implies large bandwidth requirements for large models. Hence, a typical optimization in federated learning may be to compress the weights in both ways of communication—the edge node compresses the updates sent to the central node, while the central node compresses the updates to be broadcast to the edge nodes for the next training cycle. Research shows that, in some instances at least, applying aggressive compression, such as down to one bit per weight, may be an efficient trade-off between communication overhead and convergence speed as a whole.

However, such aggressive compression may come at a price, namely, poor model convergence performance. In contrast, there are cases where the non-quantized, non-compressed updates could result in a sufficiently faster convergence rate to justify the higher communication costs. The development of methods for intelligently compressing gradients is desirable for FL applications. Especially when it can be done by deciding when to send a compressed gradient, and when to send an uncompressed gradient, while maintaining the convergence rate and accuracy at acceptable levels.

B. Context for Some Example Embodiments

B.1 Deep Neural Network Training

The training of machine learning models may rely on training algorithms, usually supported by optimization. Training approaches usually rely on the backpropagation algorithm and the Stochastic Gradient Descent (SGD) optimization algorithm for deep neural networks.

Before initialization, a network topology of neurons and interconnecting weights may be chosen. This topology may determine how the calculations will flow through the neural network. After that, an initialization may be performed, setting the weight values to some random or predefined values. Finally, the training algorithm may separate batches of data and flow them through the network. Afterward, one step of backpropagation may occur, which will set the direction of movement of each of the weights through the gradients. Finally, the weights may move by a small amount, ruled by the algorithm learning rate. This process may go on for as many batches as necessary until all training data is consumed. This more significant iteration is called an epoch. The training may go on until a predefined number of epochs is reached, or any other criteria are met, for example, no significant improvement seen over the last 'k' epochs.

B.2 Federated Learning

Federated Learning is a machine learning technique where the goal is to train a centralized model while the training data remains distributed on many client nodes. Typically, the network connections and the processing power of such client nodes are unreliable and slow. The main idea is that client nodes can collaboratively learn a shared machine learning model, such as a deep neural network, while keeping the training data private on the client device, so the model can be learned, and refined, without storing a huge amount of data in the cloud or in the central node. Every process with many data-generating nodes can benefit from such an approach, and these examples are countless in the mobile computing world.

In the context of FL, and as used herein, a central node can refer to any machine with reasonable computational power that receives the updates from the client nodes and aggregates these updates on the shared model. A client node may comprise any device or machine that contains data that may be used to train the machine learning model. Examples of client nodes include, but are not limited to, connected cars, mobile phones, storage systems, network routers, and autonomous vehicles.

With reference now to FIG. 1, an example methodology 100 for training of a neural network in a federated learning setting is shown. In general, the methodology 100 may operate iteratively, or in cycles. These cycles may be as follows: (1) the client nodes download the current model from the central node—if this is the first cycle, the shared model may be randomly initialized; (2) then, each client node may train the model, using local client node data, during a user-defined number of epochs; (3) the model updates may then be sent from the client nodes to the central node(s)—in example embodiments, such updates may comprise vectors containing the gradients, that is, the changes to the model; (4) the central node may then aggregate these vectors and update the shared model with the aggregated vectors; and, (5) if the predefined number of cycles 'N' is reached, finish the training—otherwise, return to (1) again.

B.3 Example Compression Techniques for Federated Learning

Figure 2:
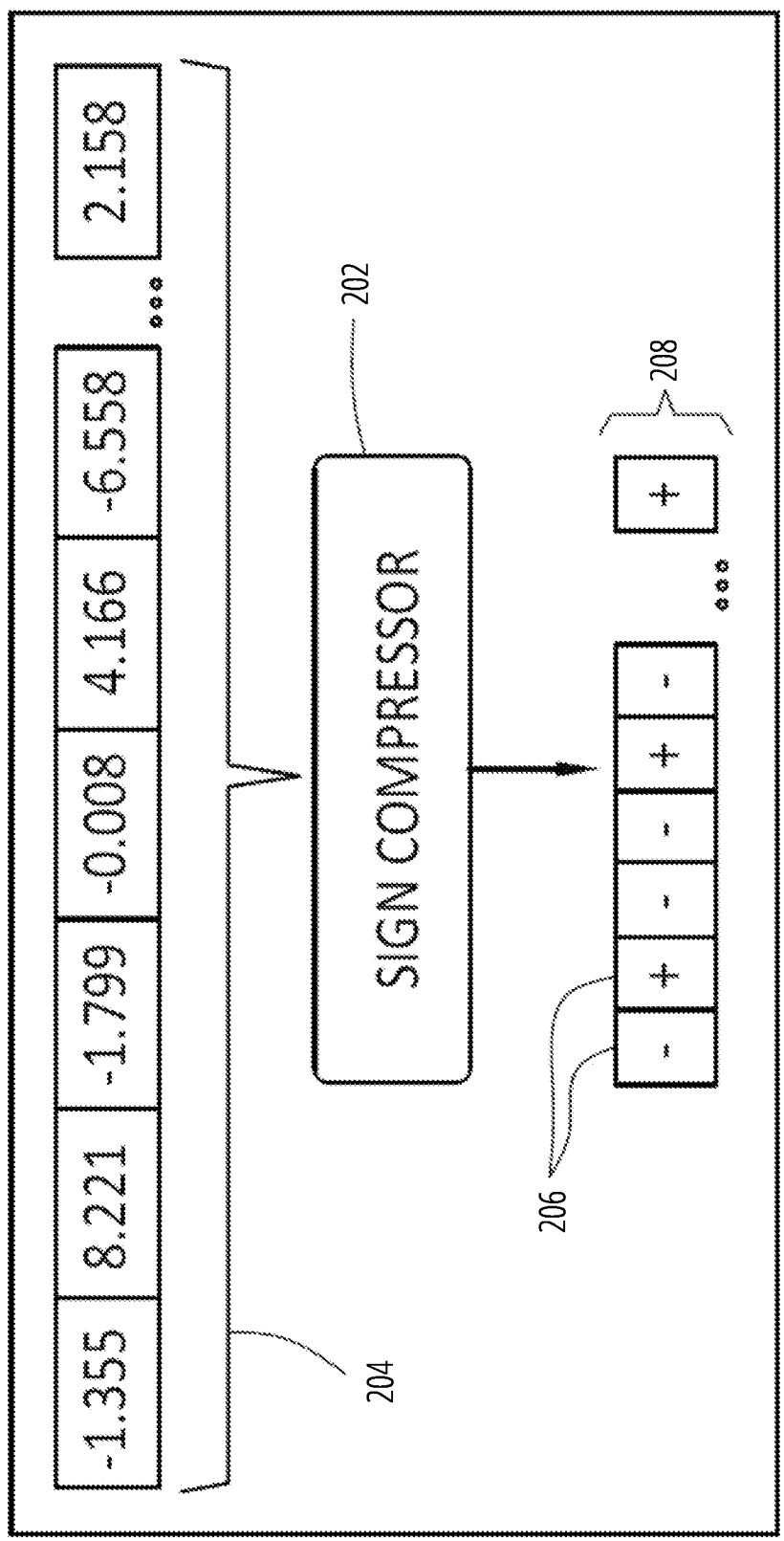
FIG. 2 illustrates a sign compressor being used to compress a gradient vector.

There is currently interest in a number of different methods with the aim of reducing the communication cost of federated learning algorithms. One approach for gradient compression is the SIGNSGD, or sign compression, with majority voting. In general, and as shown in FIG. 2, a sign compressor 202 may receive various gradient values 204, which may be positive or negative. The sign compressor 202 may strip out the magnitude information from each gradient value, leaving only a group of signs 206 which, together, define a gradient vector 208. As shown, the signs 206 may be positive or negative, and because the gradient vector 208 includes only the signs, the size of the gradient vector is thereby reduced relative what its size would be if the gradient values had been retained.

Thus, for example, this sign compression approach may allow sending 1-bit per gradient component, which may constitute a 32× gain compared to a standard 32-bit floating-point representation. However, there is still no method to reduce the compression without impacting the convergence rate or final accuracy.

C. Further Aspects of Some Example Embodiments

C.1 Overview

This section addresses edge-weighted quantization in federated learning, examples of which are disclosed in the 'Related Application' referred to herein. As noted above, gradient compression in federated learning may be implemented by employing quantization such as, for example, a 1-bit (or sign) compression from a 32-bit float number, keeping only the mantissa or the sign. The compression of such algorithms is very powerful, even though the learning process becomes less informative since gradients are limited in information and direction regarding the loss function.

Hence, example embodiments are directed to, among other things, methods for deciding when, that is, in which training cycle, to send (1) a complete 32-bit gradient, which is more informative than a compressed gradient, while also being larger in size than a compressed gradient, or (2) a quantized version of the gradient(s), which may be less informative that complete gradients, but smaller in size and therefore less intensive in terms of bandwidth consumption.

Figure 3:
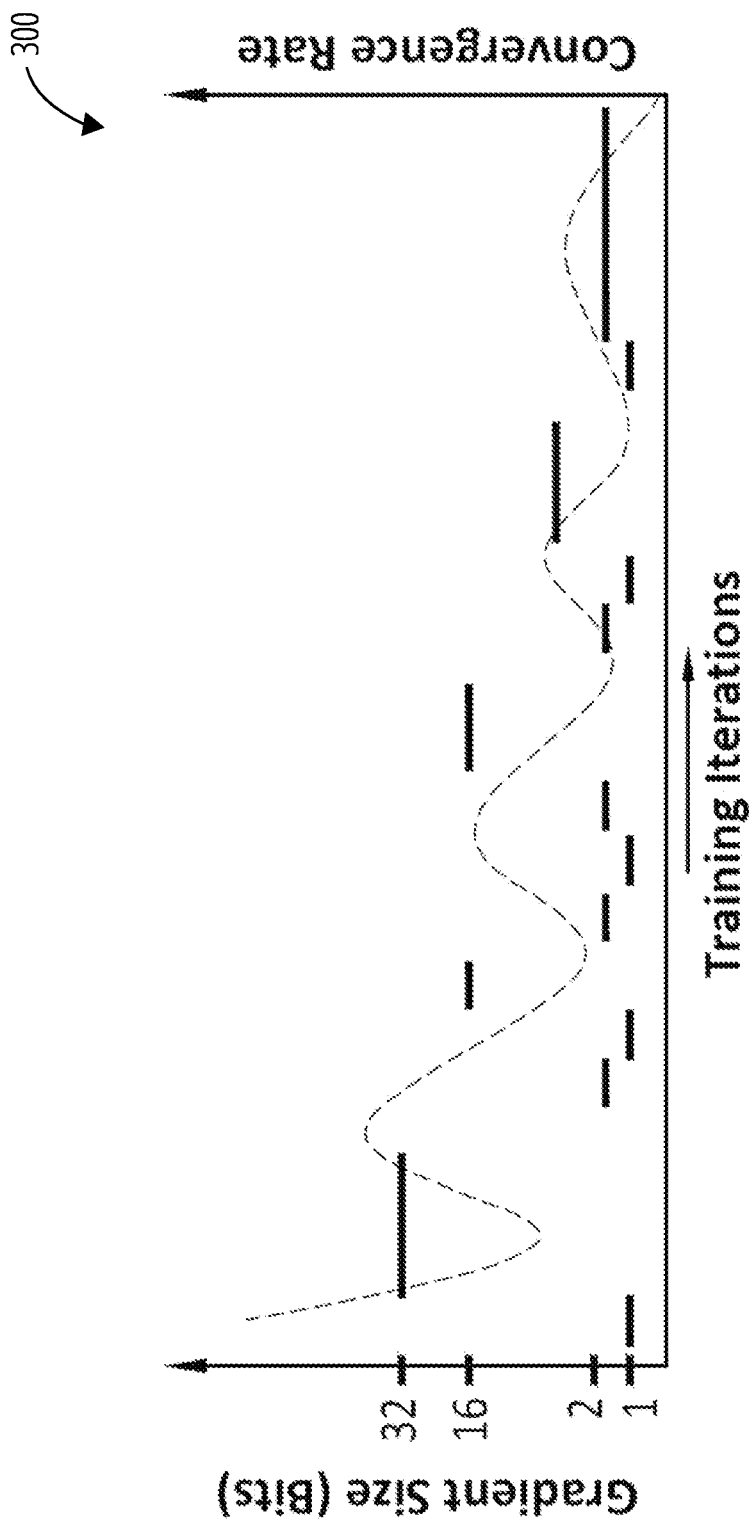
FIG. 3 illustrates training iterations and evolution of gradient size and convergence rate.

In general, example embodiments may deal with the problem of training a machine learning model using federated learning in a domain of distributed edge devices, such as edge storage devices. These edge devices may be specialized for intense tasks and consequently have limited computational power and/or bandwidth limitations. Thus, methods according to example embodiments that may leverage the data stored in these devices while using just small computational resources are beneficial. Thus, it may be useful to employ methods capable of using the smallest possible amount of computational resources, such as, in some example cases, the bandwidth and CPU processing. Note that improving the algorithm convergence rate may help reduce the total amount of data transmitted in a lengthy training procedure with powerful compression algorithms, such as 1-bit compression. FIG. 3 illustrates the positive effects of dynamically selecting the compression rate during the training iterations of the federated learning framework.

More specifically, as shown in the example graph 300 of FIG. 3, gradient size and model convergence rate may tend to increase/decrease in unison. Thus, a relatively small gradient size, while possibly desirable from a latency and bandwidth consumption perspective, may generally correspond to a relatively low, or slow, convergence rate. On the other hand, a relatively large gradient size, which may generally correspond to a relatively fast convergence rate, may nonetheless have significant bandwidth requirements. As shown in FIG. 3, the gradient size may, generally, tend to decrease with the number of iterations, although the convergence rate likewise may tend to decrease with the number of iterations. Thus, it may be helpful to strike a balance among various factors, namely, (1) gradient size, (2) convergence rate, and (3) the number of iterations performed (more iterations take longer to train the model, and thus also consume more resources).

Figure 4:
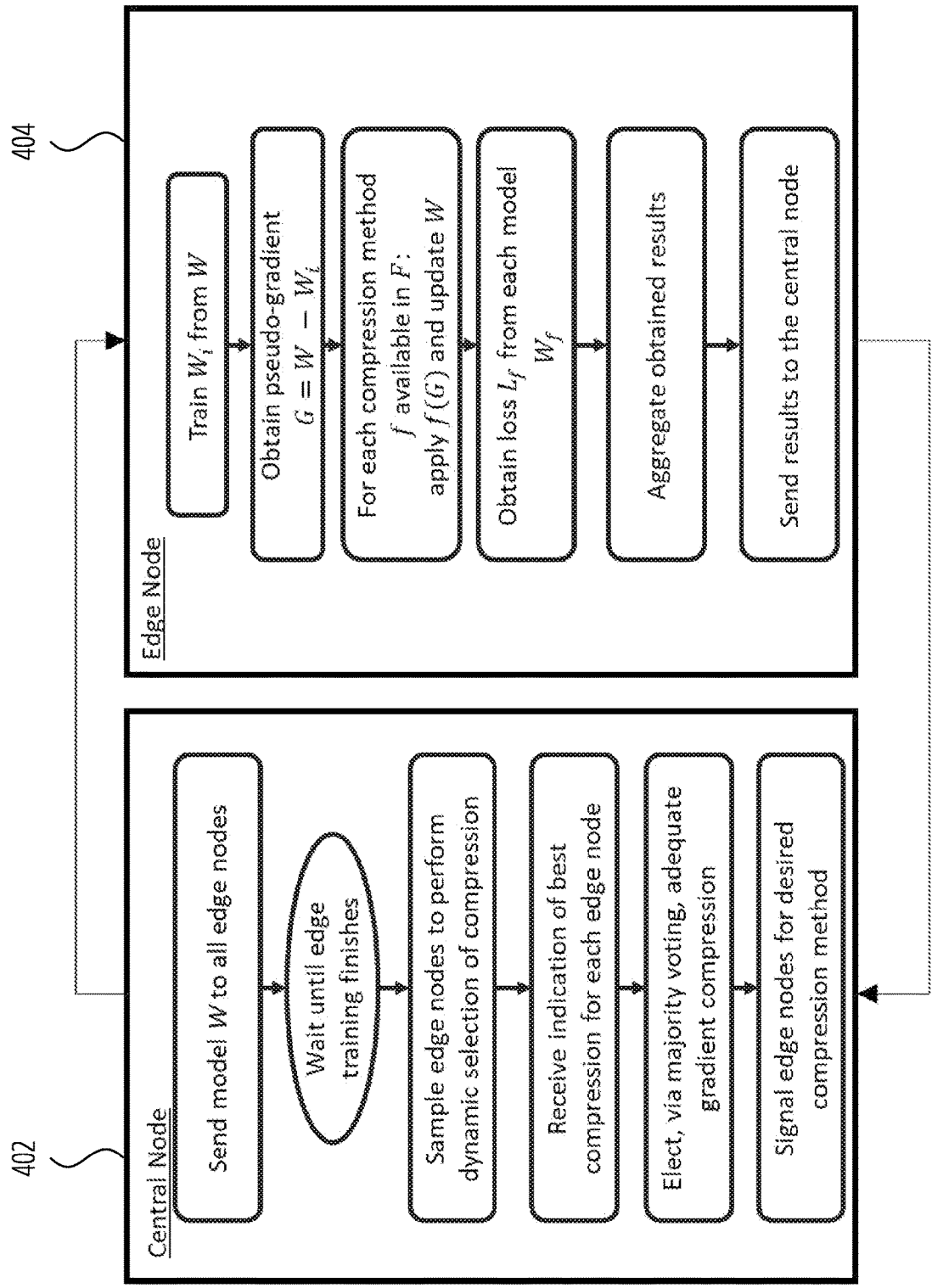
FIG. 4 illustrates an overview of a sampling method according to some example embodiments.

Thus, example embodiments may be directed to methods that include training machine learning models from a large pool of distributed edge storage arrays using federated learning while keeping the convergence rate small and using limited bandwidth. Embodiments may employ a method that samples several storage arrays, as disclosed elsewhere herein, and runs inside these devices a lightweight validation of the compression algorithm during the federated learning training, as disclosed elsewhere herein. Such embodiments may include getting a validation dataset inside the edge device, updating the model using the gradient compressor, training for some epochs, and evaluating the loss of this model. Then, each one of the sampled storage arrays, or other edge devices, may send its best compression algorithm to the central node. The central node may then aggregate the information received from the edge arrays, decide the best compression method for the federation, and inform the edge nodes of the selection made, as disclosed elsewhere herein. Thus, in methods according to some example embodiments, the edge nodes may compress the gradients of their training using the best compression algorithm and, the training process continues. The process may repeat for every t cycles of the federated learning training method. FIG. 4 gives a general overview of a method and technique according to some example embodiments.

In FIG. 4, the left part of the figure discloses example operations that may be performed inside a central node 402, while the right part of the figure discloses example operations that may be performed inside each one of the edge storage nodes 404. Note that some operations in FIG. 4 implicitly determine a waiting block for ensuring synchronous processing. Note that all the selected edge nodes may run the compression and update the model for all compressions in 'F' to find the best possible compressor, given the various factors, such as gradient size, convergence rate, and number of iterations performed, that may need to be balanced. The method running inside the edge node 404 may be a lightweight process, since each of the respective models at the edge nodes may be updated only by a small number of epochs.

C.2 Sampling Edge Devices to Apply the Dynamic Selection

As noted herein, example embodiments may deal with a federation of edge devices. In practice, this federation may have a large number of workers used for training the machine learning model, for example possibly thousands, or more, devices in the federation. As such, it may be infeasible in some cases to run the example methods of some embodiments on every device. Thus, some embodiments may incorporate a sampling operation. This sampling operation may operate to randomly select a smaller number of edge workers so that they are used to choosing the best compressor for the whole federation. In some embodiments, the sampling method keeps the distribution of devices selected constant. That is, embodiments may not prefer one device to the detriment of others, rather, all devices should be selected the same amount of times. Note that even though embodiments may operate to choose a subset of the edge nodes to run a process for quantization selection, the federated learning training process may still be running in all the edge nodes, or in a defined number of edge nodes.

Figure 5:
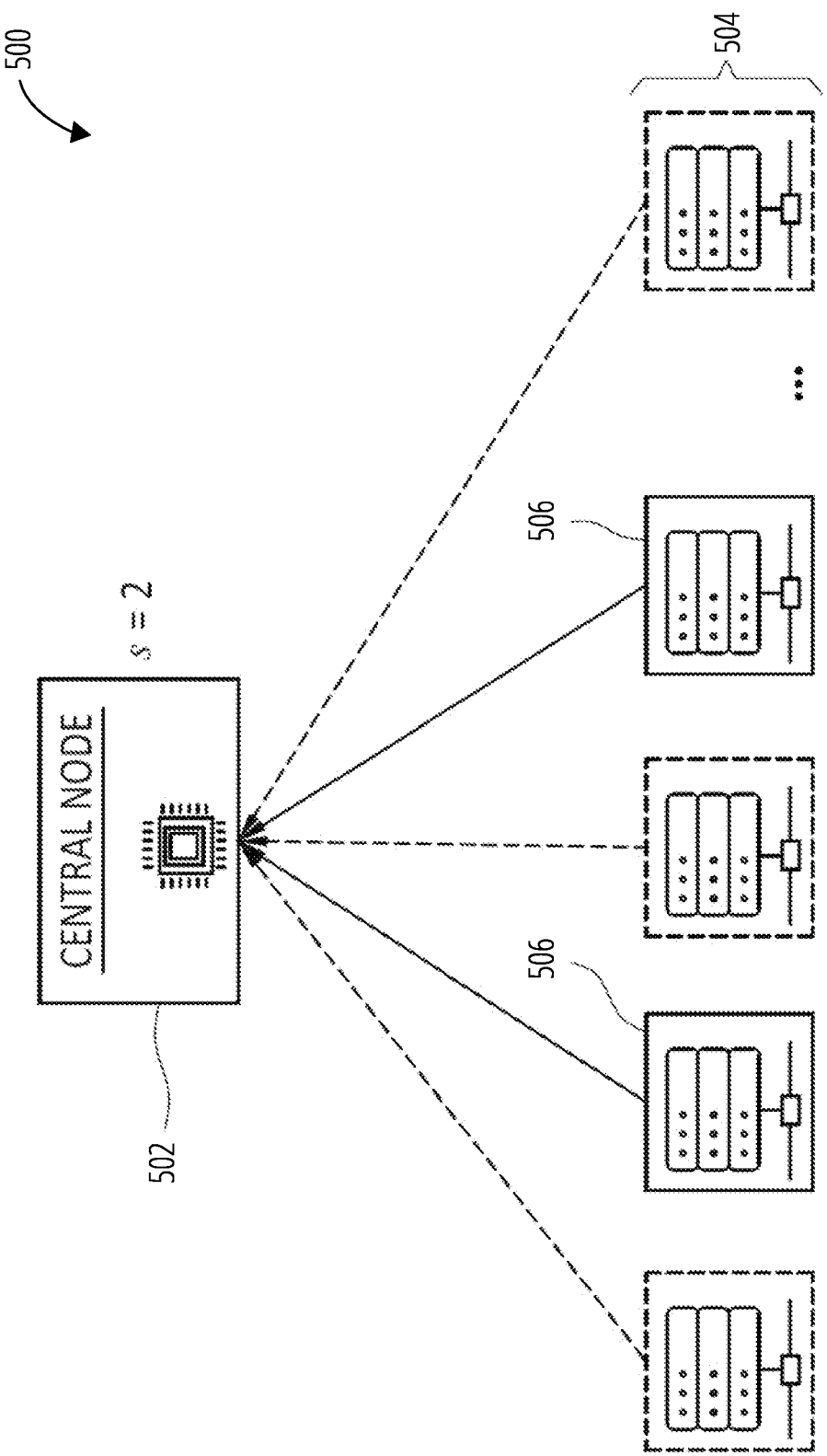
FIG. 5 illustrates an example of a sampling method in a federation of edge storage devices when 's'=2.

The number 's' of devices designated to run a quantization selection procedure will run may be a pre-defined parameter determined by the user, or federation owner, for example. Thus, 's' may represent the number, such as an integer number, of selected devices, or a percentage of the total number of devices, such as 10% for example. This is an implementation detail, however, and does not change the purpose of the quantization selection procedures disclosed herein. In some example implementations of a method according to some embodiments, the parameter 's' may be dynamically selected according to a pre-defined metric. FIG. 5 shows an example of the sampling stage 500 that may be employed in example embodiments. In the example of FIG. 5, a central node 502 communicates with a group 504 of edge nodes, and the value of 's' is set at s=2. Thus, of the group 504, only edge nodes 506 are sampled in this illustrative example.

C.3 Distributed Selection of the Best Worker Compressor

Methods according to some example embodiments may comprise at least two parts running on different levels: (i) the first part may run in the central node; (ii) and the second part may run inside each one of the edge devices, examples of which include edge storage arrays, and the edge devices may be referred to herein as 'workers.' That is, the second part may be instantiated at each edge device in a group of edge devices, so that a respective instantiation of the second part is running, or may, at each edge device. The following discussion is directed to the portion, or stage, running inside the edge devices. The discussion is presented with reference to the particular example of edge storage arrays, but it should be understood that such reference is only for the purposes of illustration, and is not intended to limit the scope of the invention in any way.

First, each edge storage array may receive a model from the central node, as standard in any federated learning training. Then, each of the edge storage arrays may process the training stage of the model using the local data of that edge storage array. More specifically, the method running inside the edge node may operate as follows.

Let 'W' be the definition of the model weights, synchronized across all edge nodes at the beginning of the cycle. Let 'F' be a set of known quantization functions, such as compression functions for example, which may include the identity function and the 1-bit, sign, compression function, or other maximum-compression function. Let 'Q' be a set of loss value thresholds, one for each $f \in F$, with respect to the 1-bit, or sign, compression or other maximum-compression function.

At a training cycle, a set of selected edge storage nodes, such as are disclosed herein, may perform the operations outlined below. In this manner, the selected edge nodes are configured to estimate and evaluate a convergence rate for a given quantization function.

Figure 6:
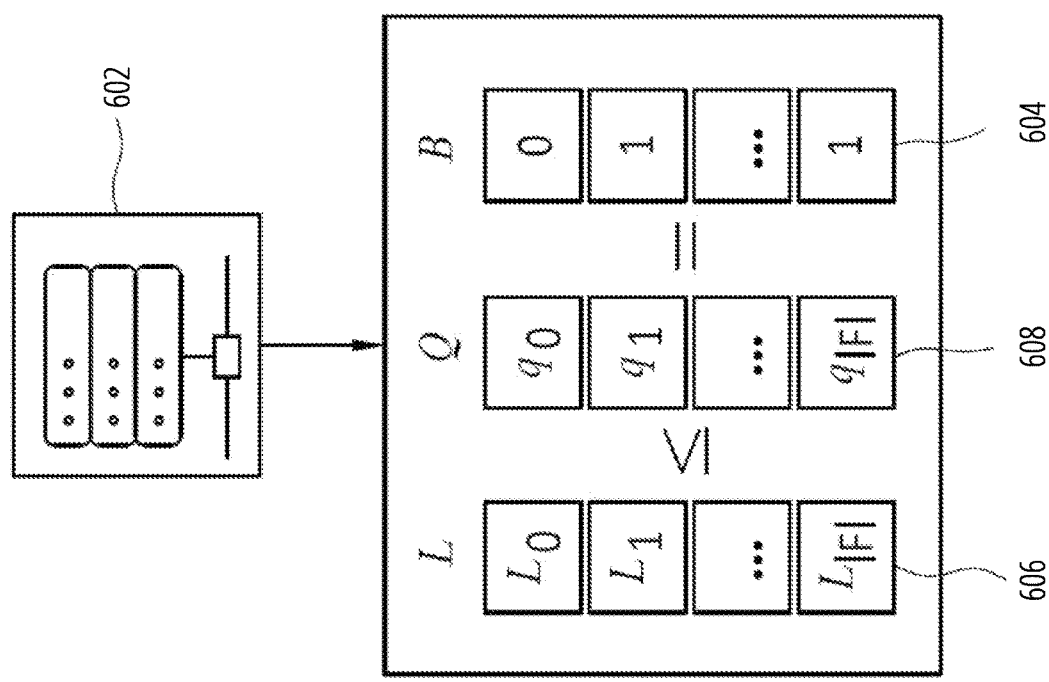
FIG. 6 illustrates calculation of an example binary vector 'B.'

1. train a model $W_i$ from W with the currently available training data;
2. from the difference between $W_i$ and W, obtain a pseudo-gradient G;
3. for each available gradient compression, or other quantization function, $f \in F$, obtain a model $W_f$ resulting from the updated model W with $f(G)$—it will be appreciated that for the identity function, $W_f = W_i$;
4. obtain a validation loss Lf for each model $W_f$— where $L_f = g(X|W_f)$, g is the machine learning model parameterized by $W_f$, and X is the validation set of the edge node;
5. for each validation loss $L_f$, compute a vector B to store whether losses are below the loss value threshold for that respective function—see the example in FIG. 6, discussed below; and
6. communicate, for each $f \in F$, one bit with the result of the Boolean computation in (5), to the central node.

As shown in the example of FIG. 6, inside each selected edge node 602, that is, each edge node selected using an embodiment of the disclosed sampling methods, embodiments may operate, for each of one or more pairs of (L, Q), to calculate a binary vector B 604 value based on one or more validation losses L 606 and loss value thresholds Q 608. This vector 604 may contain information indicating whether or not a given compressor $f$ is better, in terms of its performance, than its pre-defined threshold. Thus, for example, if L>Q, that is, the loss experienced by running a quantization function at an edge node, is greater than a loss value threshold, then a value of '0' may be added to the vector 604. On the other hand, if the loss is less than, or equal to, the loss value threshold, a value of '1' may be added to the vector 604. In this example, vector 604 values of '1' indicate that the associated quantization function has been determined by the edge node to have functioned acceptably, that is, at or below a maximum threshold for loss.

C.4 Centralized Dynamic Selection of the Gradient Compression

The second part of one example method (see C.3 above) may run inside the central node. As used herein, a central node may comprise a server with reasonable computational power and a large capacity to deal with incoming information from the edge nodes. In federated learning training, the central node is responsible for aggregating all edge node information and giving guidance to generate the next step model. In some example embodiments, the central node may also operate to define the best compression algorithm to use in the subsequent few training cycles. The process of selecting a recommended compression algorithm to reduce the communication bandwidth and improve the convergence rate of the federated learning training is defined as described below.

The method running in the central node may comprise the following operations:

1. receive a respective set of binary vectors B from each of the sampled edge nodes;
2. elect, via majority-voting or any other aggregation function h, a compression method, or other quantization method, that was selected by the majority of edge nodes as achieving an adequate compression/convergence tradeoff, as defined by Q (see, e.g., FIG. 6); and
3. signal the edge nodes for the desired elected quantization level updates to be gathered.

At this point, the storage edge nodes, receiving that information, submit to the central node the updates. The central node may then perform an appropriate aggregation function, such as a federated average for example, on the received gradient updates in order to update the model W for the next cycle.

Figure 7:
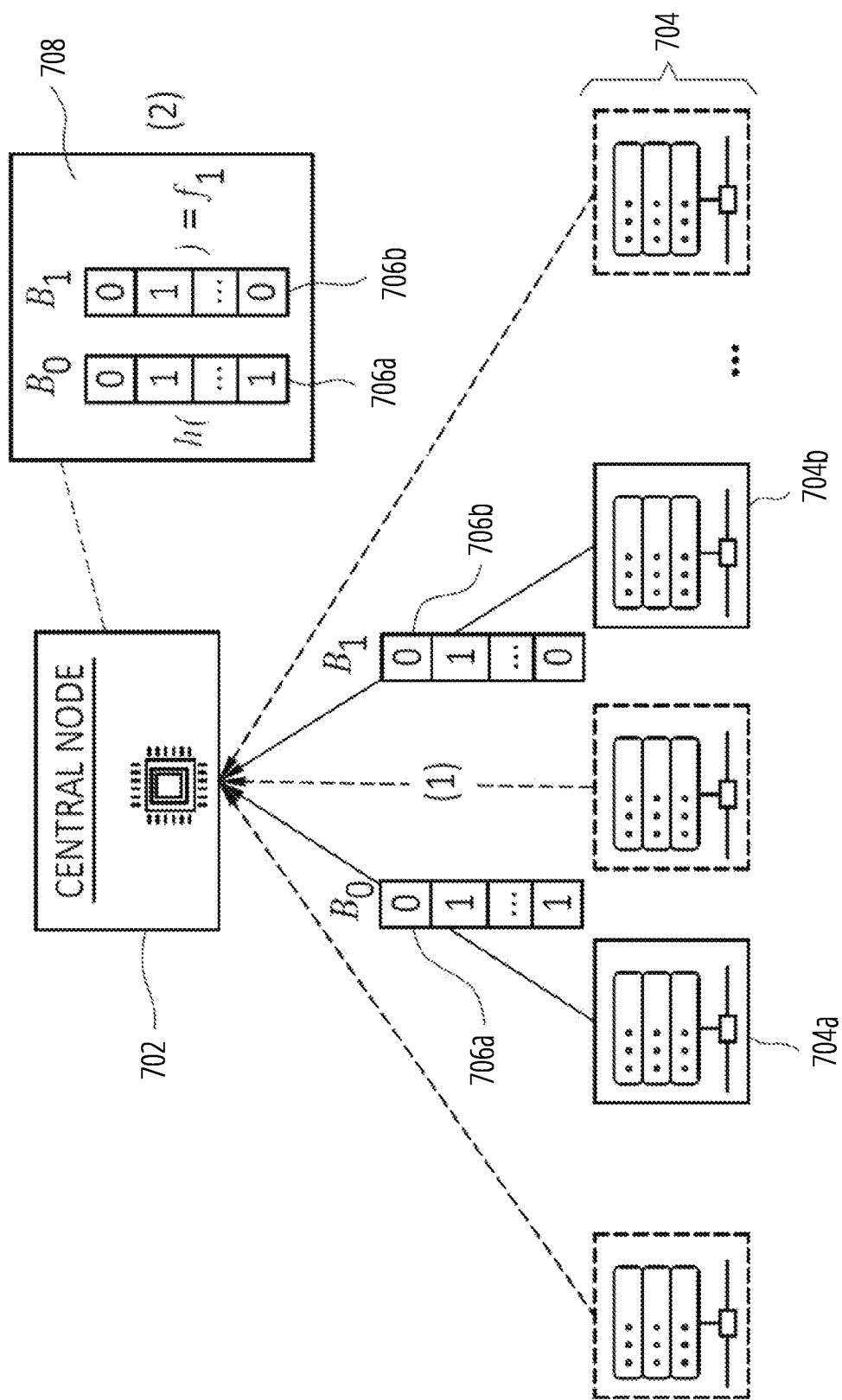
FIG. 7 illustrates operations for generating, and aggregating, binary vectors.

With reference now to the example of FIG. 7, a central node 702 is shown that is operable to communicate with a group of edge nodes 704. In general, and discussed above, the central node 702 may receive (1), such as from edge nodes 704a and 704b selected for sampling, respective binary vectors 706a and 706b computed by those edge nodes. After receipt of the binary vectors 706a and 706b, the central node 702 may then aggregate (2) those binary vectors 706a and 706b to define the compression algorithm $f_1$ 708 that will be used for the next training iterations of the model (not shown in FIG. 7). After that the new compressor, that is, the compression algorithm $f_1$ 708, is communicated back to all of the edge nodes 704, the training process continues.

Figure 8:
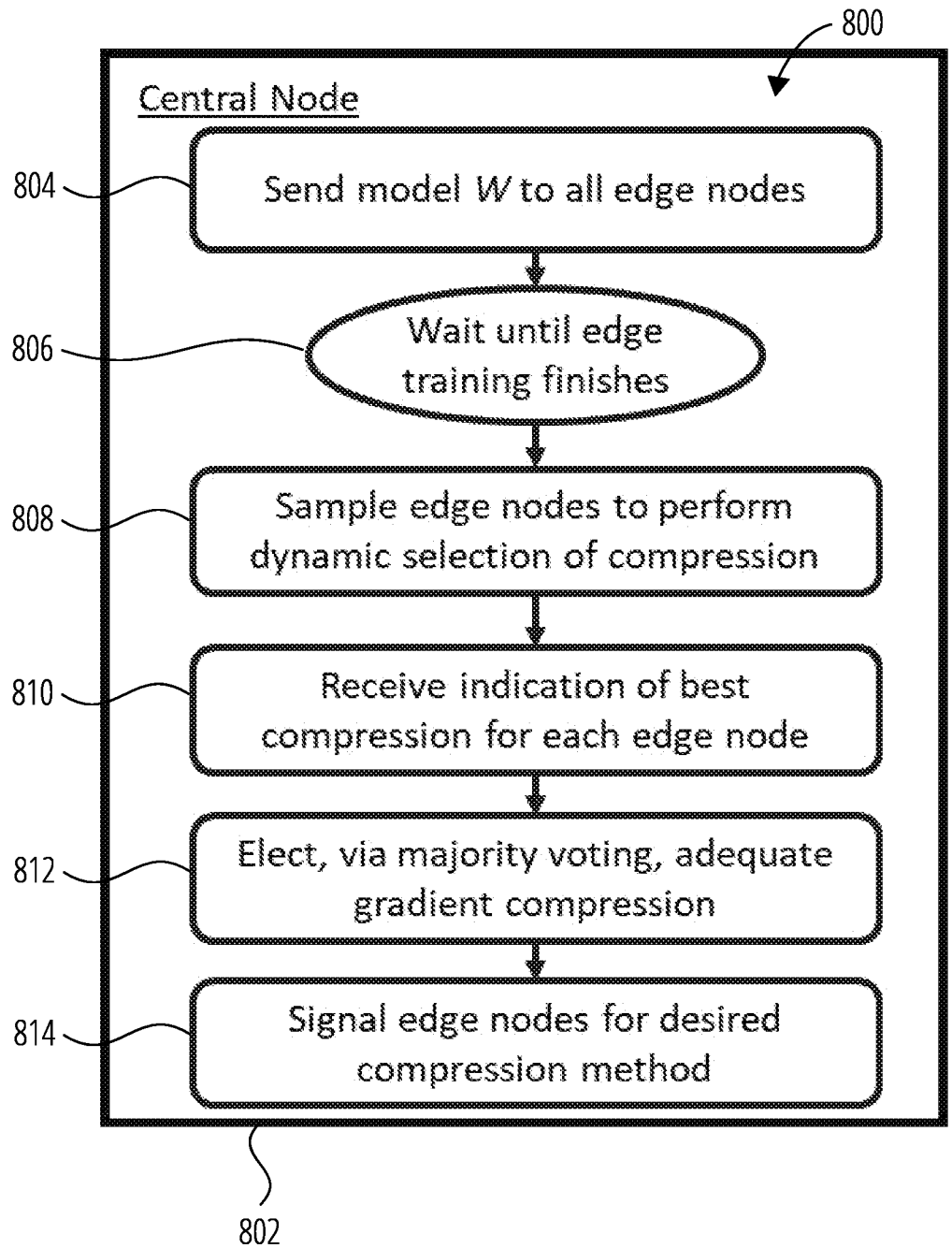
FIG. 8 illustrates performance of an example of a dynamic sampling algorithm.

Thus, some example embodiments may be directed to a method for dynamic sampling of the edge nodes to run the quantization procedure without slowing the federated learning process and while using only a small amount of statistics from the training performed inside the edge node. To this end, example embodiments may comprise a procedure to receive and process the statistics from the edge storage nodes and run the sampling algorithm. In general, the dynamic sampling algorithm according to some embodiments may run inside the central node, which the federated learning processing uses to aggregate the learning information. Thus, example embodiments may not impose any additional processing or memory loads, for example, on any of the edge storage nodes. FIG. 8 shows aspects of an example method 800 that may execute inside a central node 802, that is, a method 800 to run a dynamic sampling algorithm, the edge-weighted quantization and the federated learning procedure inside the central node 802.

The example method 800 may begin when the central node 802 sends 804 a model, such as an ML (machine learning) model for example, to a group of edge nodes, which may then train respective instances of the model using local edge node data. After waiting 806 for the training process to complete, the central node 802 may then perform 808 an edge node sampling to identify edge nodes that will be used to identify, and select, a quantization process that meets established requirements and standards. After the sampling and selection of edge nodes are complete, the edge nodes may then run various quantization processes, and identify which quantization process provides the best performance, for example based on an estimated convergence rate. As a result, the central node 802 may receive 810, from each edge node, a respective indication as to which quantization process was identified by that edge node as providing the best performance. The central node 802 may then select 812, from among the various quantization processes identified by the edge nodes, the quantization process providing the best performance, and may include evaluating, for example, gradient compression, model convergence, and number of training iterations required. The selection 812 may be performed in any suitable manner and, in some example embodiments, may include selecting the quantization process identified by the most edge nodes as providing the best performance. After the selection 812 has been performed, the central node 802 may then inform 814 the edge nodes which quantization method should be used.

C.5 Collecting Statistics on Edge Nodes

Among other things, example embodiments of the method may perform the collection of statistics from the procedures performed inside the edge nodes so that the central node may select the best quantization procedure. Example embodiments include a framework that may have two types of edge nodes: (i) a sampled edge node; and (ii) a non-sampled edge node. Embodiments may operate to collect statistics about the federated learning training in the sampled edge nodes.

Regarding the type of statistics being collected inside each storage edge node, example embodiments may employ a variety of possibilities. Examples of such statistics include, but are not limited to, the training time of the federated learning procedure and the memory usage for the federated learning procedure.

Figure 9:
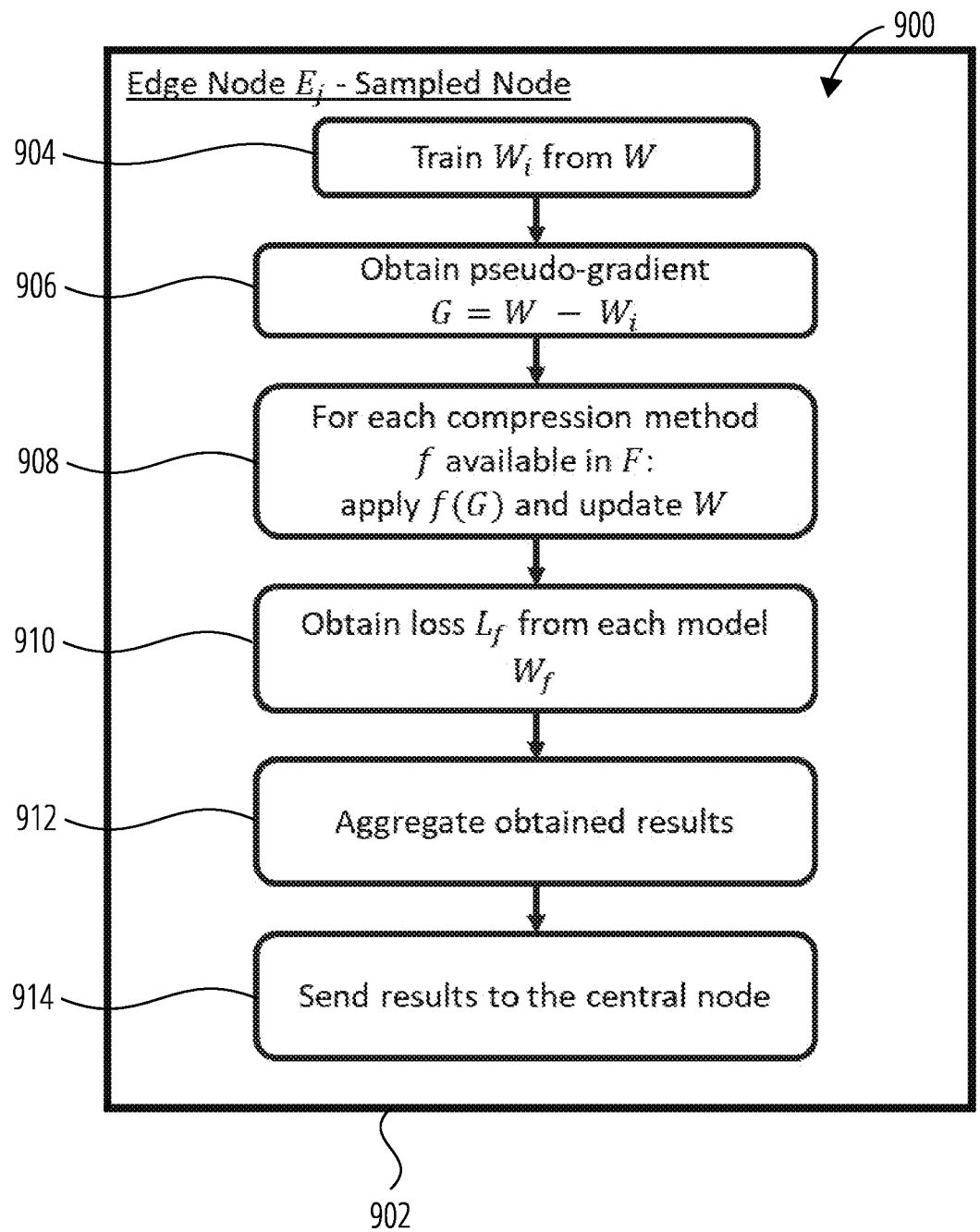
FIG. 9 illustrates a flowchart of example operations performed by a sampled edge node.
Figure 10:
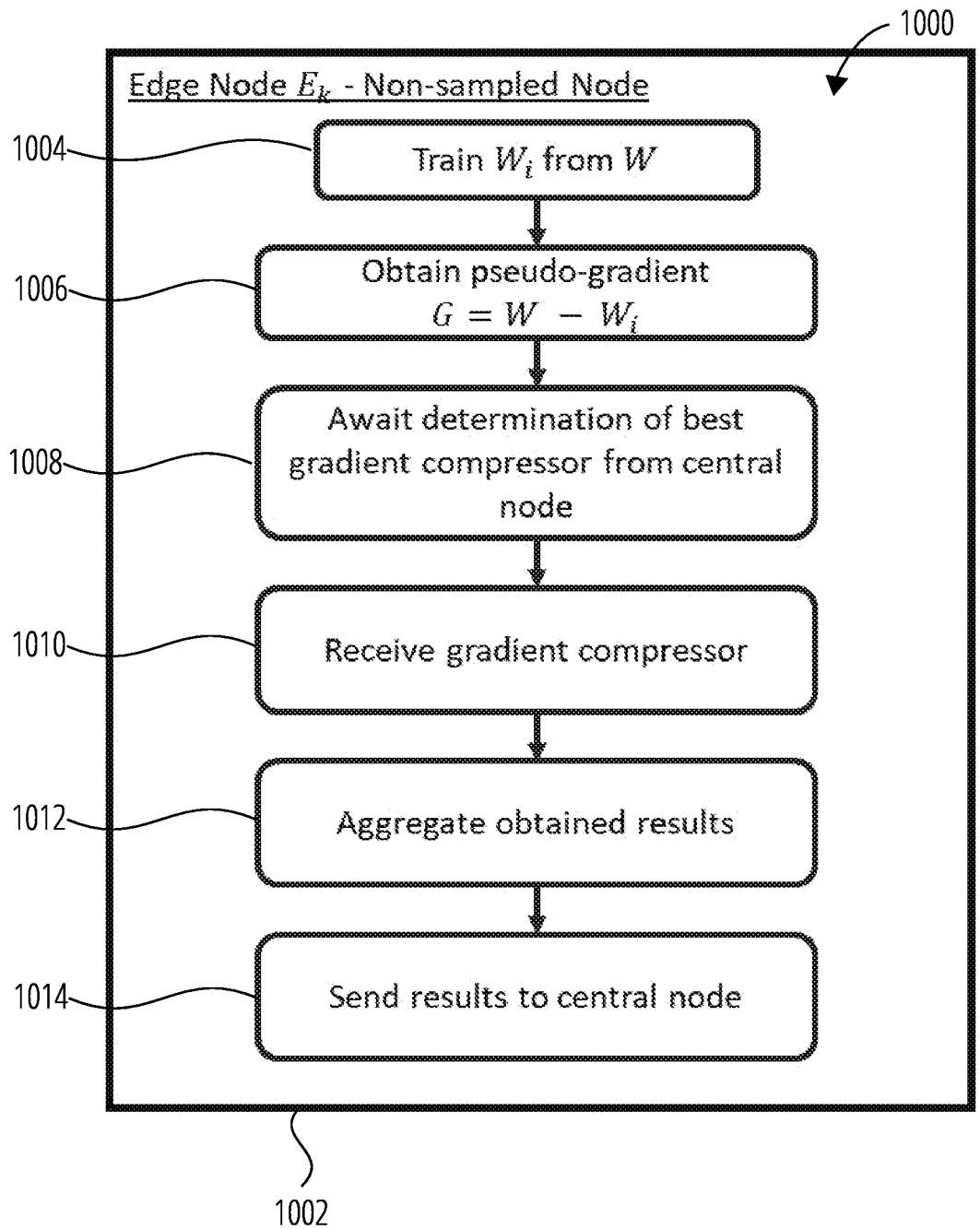
FIG. 10 illustrates a flowchart of example operations performed by a non-sampled edge node.

FIG. 9 and FIG. 10 describe running the procedures and collecting the statistics inside the edge storage node. In particular, FIG. 9 discloses a flowchart of the operations that may be performed by a sampled edge node 902. A sampled edge node is an edge node that may run both the federated learning procedure and the quantization selection procedure. By way of contrast, FIG. 10 discloses a flowchart of the operations that may be performed by a non-sampled edge node 1002. A non-sampled edge node is an edge node that does not run the quantization selection procedure.

C.5.1 Statistics Collection—Sampled Edge Node

With more particular reference now to FIG. 9, an example method 900 may be performed at the edge node 902, and may begin with the training 904 of the local instantiation $W_i$ of the model W. During, or subsequent to the training 904, the pseudo-gradient G may be obtained 906. The edge node 902 may collect statistics from the training process 904. The training process statistics may be sent 914 to a central node.

At the same time as, or at another time, as the training process statistics are being collected, the edge node 902 may also evaluate 908 each compression method available at the edge node 902. The loss experienced by the model W for each different compression method may then be obtained 910. The results obtained at 910 may then be aggregated 912, and sent 914 to the central node.

C.5.2 Results Collection—Non-Sampled Edge Node

With attention next to FIG. 10, details are provided concerning the flowchart of the operations in a method 1000 performed by the non-sampled edge node 1002. The example method 1000 may begin with the training 1004 of the local instantiation $W_t$ of the model W. After the training 1004, the pseudo-gradient G may be obtained 1006.

After the pseudo-gradient G has been obtained 1006, the non-sampled edge node 1002 may wait 1008 for the central node to calculate the gradient compressor, or other quantizer, having the best performance. The non-sampled edge node 1002 may then receive 1010 the best-performing compressor from the central node, aggregate 1012 the results obtained from the use of the compressor, and send 1014 those results to the central node.

Figure 11:
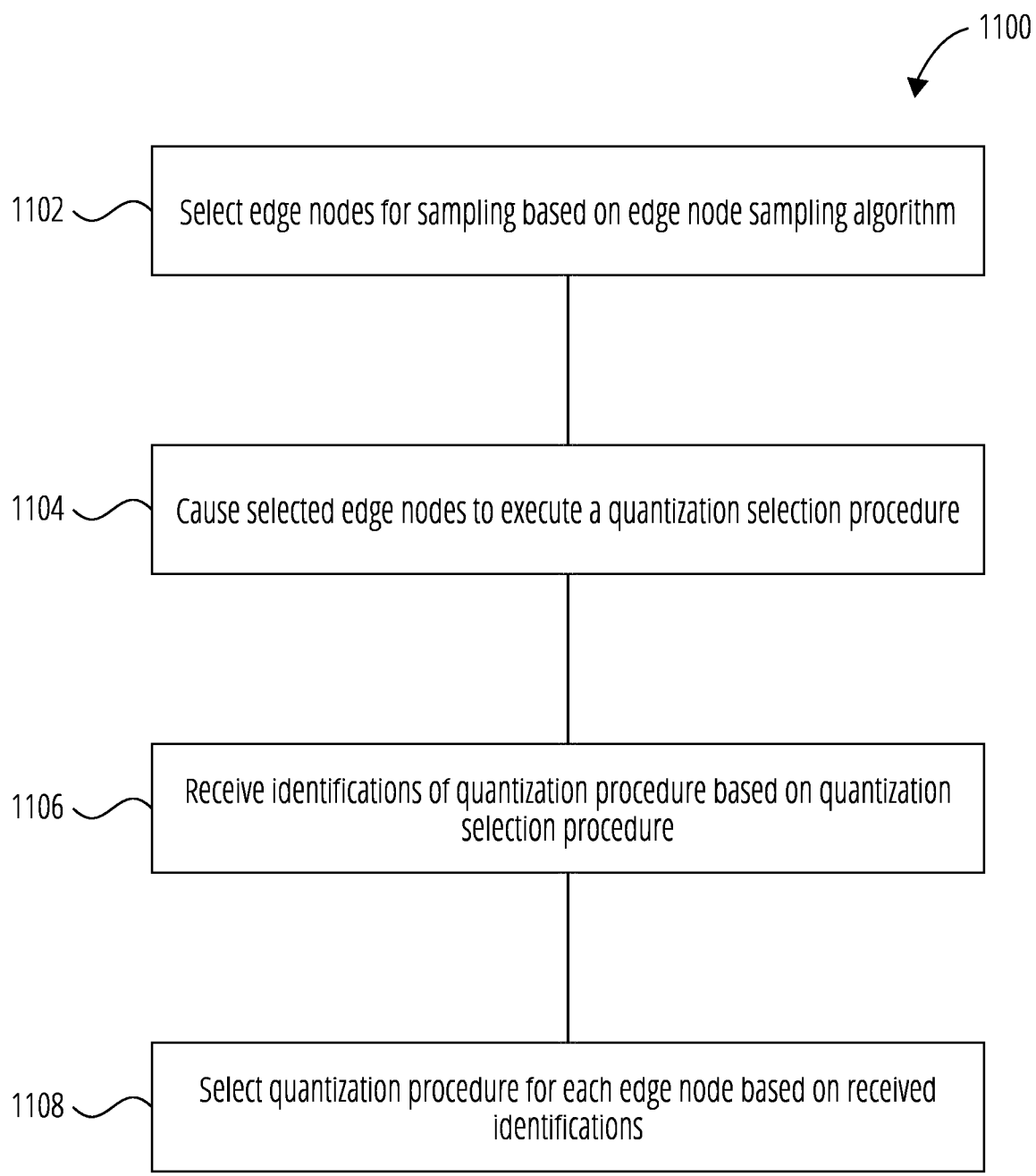
FIG. 11 illustrates an example method for dynamic sampling.

FIG. 11 provides details concerning dynamic edge-weighted quantization in a method 1100.

Example embodiments of the method 1100 include steps 1102 through 1108. In some embodiments these steps may be performed at a central node that communicates with edge nodes.

The method 1100 includes selecting 1102 edge nodes for sampling based on an edge node sampling algorithm. The edge node sampling algorithm is configured to use a specified number 's' of edge nodes to be sampled. In some embodiments, the specified number 's' may be dynamically selected according to a pre-defined metric. In some embodiments, the specified number of edge nodes can be randomly sampled among the group of edge nodes in communication with the central node.

The method 1100 includes causing 1104 the selected edge nodes to execute a quantization selection procedure. The quantization selection procedure can be configured to identify a quantization procedure that meets one or more established parameters. Example parameters for evaluating the quantization procedure include, but are not limited to: training time of an associated federated learning process and memory usage for the associated federated learning process. Additional example parameters for evaluating the quantization procedure can include: (1) one or more validation losses for the quantization procedure, and (2) one or more loss value thresholds for the quantization procedure. The validation loss can be determined based on a given model and on a given validation set for the selected edge node.

The method 1100 includes receiving 1106 identifications of a quantization procedure based on the quantization selection procedure, from the selected edge nodes. The quantization procedure can be operable to quantize a gradient generated by one of the edge nodes. The gradient can comprise information about performance of a federated learning process at a given selected edge node. Quantization of the gradient can comprise compression of the gradient.

The method 1100 includes selecting 1108 a quantization procedure for each edge node, based on the identifications of the quantization procedures for the selected edge nodes. For example, the quantization procedure can be selected that was identified by the largest number of edge nodes as providing the best performance.

In some embodiments, the method 1100 further includes causing each edge node to execute the selected quantization procedure.

While the various steps in the example methods 800, 900, 1000, and 1100 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is further noted with respect to the example methods 800, 900, 1000, and 1100 of FIG. 8, FIG. 9, FIG. 10, and FIG. 11 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

At least portions of the present edge-weighted quantization systems and methods can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories, and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the present edge-weighted quantization system. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 12. Although described in the context of the present edge-weighted quantization system, these platforms may also be used to implement at least portions of other information processing systems in other embodiments.

Figure 12:
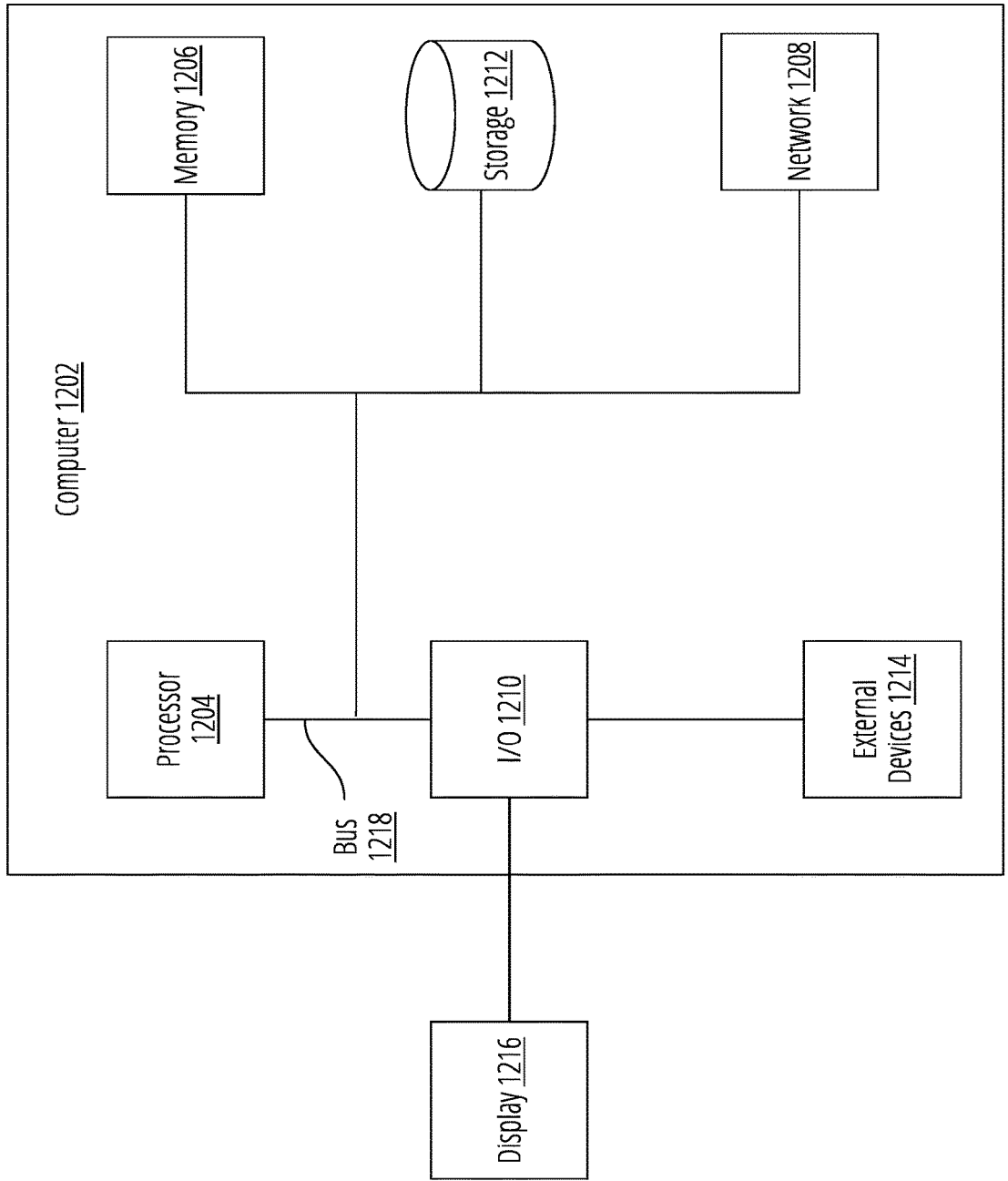
FIG. 12 illustrates a computing entity operable to perform any of the disclosed methods, processes, and operations.

FIG. 12 shows aspects of a computing device or a computing system in accordance with example embodiments. The computer 1202 is shown in the form of a general-purpose computing device. Components of the computer may include, but are not limited to, one or more processors or processing units 1204, a memory 1206, a network interface 1208, and a bus 1218 that communicatively couples various system components including the system memory and the network interface to the processor.

The bus 1218 represents one or more of any of several types of bus structures, including a memory bus or memory controller, a peripheral bus, an accelerated graphics port, and a processor or local bus using any of a variety of bus architectures. Example architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1202 typically includes a variety of computer-readable media. Such media may be any available media that is accessible by the computer system, and such media includes both volatile and non-volatile media, removable and non-removable media.

The memory 1206 may include computer system readable media in the form of volatile memory, such as random-access memory (RAM) and/or cache memory. The computer system may further include other removable/non-removable, volatile/non-volatile computer system storage media. By way of example only, the storage system 1212 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 1218 by one or more data media interfaces. As has been depicted and described above in connection with FIGS. 1-11, the memory may include at least one computer program product having a set (e.g., at least one) of program modules that are configured to carry out the functions of the embodiments as described herein.

The computer 1202 may also include a program/utility, having a set (at least one) of program modules, which may be stored in the memory 1206 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 1202 may also communicate with one or more external devices 1214 such as a keyboard, a pointing device, a display 1216, etc.; one or more devices that enable a user to interact with the computer system; and/or any devices (e.g., network card, modem, mobile hotspot, etc.) that enable the computer system to communicate with one or more other computing devices. Such communication may occur via the input/output (I/O) interfaces 1210. Still yet, the computer system may communicate with one or more networks such as a local area network (LAN), a general wide area network (WAN), and/or a public network (e.g., the Internet) via the network adapter 1208. As depicted, the network adapter communicates with the other components of the computer system via the bus 1218. It should be understood that although not shown, other hardware and/or software components could be used in conjunction with the computer system. Examples include but are not limited to microcode, device drivers, redundant processing units, external disk drive arrays, Redundant Array of Independent Disk (RAID) systems, tape drives, data archival storage systems, etc.

D. Further Discussion

As disclosed herein, example embodiments may provide various useful features and advantages. For example, embodiments may provide a mechanism to dynamically sample edge nodes configured to perform an edge-weighted quantization process. An embodiment may operate to train FL models with dynamic selection of gradient compression at the central node, based on an edge-side assessment of the estimated convergence rate at selected edge nodes.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Specific embodiments have been described with reference to the accompanying figures. In the above description, numerous details have been set forth as examples. It will be understood by those skilled in the art that one or more embodiments may be practiced without these specific details and that numerous variations or modifications may be possible without departing from the scope of the invention. Certain details known to those of ordinary skill in the art have been omitted to avoid obscuring the description.

In the above description of the figures, any component described with regard to a figure, in various embodiments of the invention, may be equivalent to one or more like-named components described with regard to any other figure. For brevity, descriptions of these components have not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A system comprising:
   at least one processing device including a processor coupled to a memory;
   the at least one processing device being configured to implement the following steps:
      selecting edge nodes for sampling based on an edge node sampling algorithm configured to use a specified number of edge nodes to be sampled;
      causing the selected edge nodes to execute a quantization selection procedure, the quantization selection procedure including:
         evaluating a plurality of quantization procedures by applying each quantization procedure to local gradient data at each respective edge node;
         using validation data to determine performance metrics including validation losses for each quantization procedure; and
         identifying a quantization procedure from the plurality of quantization procedures based on the performance metrics meeting predetermined performance criteria;
      receiving, from the selected edge nodes, identifications of the quantization procedures based on the quantization selection procedure;
      selecting a quantization procedure for each edge node based on the identifications of the quantization procedures for the selected edge nodes; and
      causing each edge node to execute the selected quantization procedure.

2. The system of claim 1, wherein the quantization selection procedure is configured to identify the quantization procedure that meets one or more established parameters.

3. The system of claim 1, wherein the quantization procedure is operable to quantize a gradient generated by one of the edge nodes.

4. The system of claim 3, wherein the gradient comprises information about performance of a federated learning process at one of the edge nodes.

5. The system of claim 3, wherein quantization of the gradient comprises compression of the gradient.

6. The system of claim 1, wherein the at least one processing device comprises a central node configured to communicate with the edge nodes.

7. The system of claim 1, wherein the edge node sampling algorithm randomly selects edge nodes to be sampled.

8. A method comprising:
   selecting edge nodes for sampling based on an edge node sampling algorithm configured to use a specified number of edge nodes to be sampled;
   causing the selected edge nodes to execute a quantization selection procedure, the quantization selection procedure including:
      evaluating a plurality of quantization procedures by applying each quantization procedure to local gradient data at each respective edge node;
      using validation data to determine performance metrics including validation losses for each quantization procedure; and
      identifying a quantization procedure from the plurality of quantization procedures based on the performance metrics meeting predetermined performance criteria;
   receiving, from the selected edge nodes, identifications of the quantization procedures based on the quantization selection procedure;
   selecting a quantization procedure for each edge node based on the identifications of the quantization procedures for the selected edge nodes; and
   causing each edge node to execute the selected quantization procedure.

9. The method of claim 8, wherein the quantization selection procedure is configured to identify the quantization procedure that meets one or more established parameters.

10. The method of claim 8, wherein the quantization procedure is operable to quantize a gradient generated by one of the edge nodes.

11. The method of claim 10, wherein the gradient comprises information about performance of a federated learning process at one of the edge nodes.

12. The method of claim 10, wherein quantization of the gradient comprises compression of the gradient.

13. The method of claim 8, wherein the method is performed at a central node configured to communicate with the edge nodes.

14. The method of claim 8, wherein the edge node sampling algorithm randomly selects edge nodes to be sampled.

15. A non-transitory processor-readable storage medium having stored therein program code of one or more software programs, wherein the program code when executed by at least one processing device causes the at least one processing device to perform the following steps:
   selecting edge nodes for sampling based on an edge node sampling algorithm configured to use a specified number of edge nodes to be sampled;
   causing the selected edge nodes to execute a quantization selection procedure, the quantization selection procedure including:
      evaluating a plurality of quantization procedures by applying each quantization procedure to local gradient data at each respective edge node;
      using validation data to determine performance metrics including validation losses for each quantization procedure; and
      identifying a quantization procedure from the plurality of quantization procedures based on the performance metrics meeting predetermined performance criteria;
   receiving, from the selected edge nodes, identifications of the quantization procedures based on the quantization selection procedure;
   selecting a quantization procedure for each edge node based on the identifications of the quantization procedures for the selected edge nodes; and
   causing each edge node to execute the selected quantization procedure.

16. The computer-readable medium of claim 15, wherein the quantization selection procedure is configured to identify the quantization procedure that meets one or more established parameters.

17. The computer-readable medium of claim 15, wherein the quantization procedure is operable to quantize a gradient generated by one of the edge nodes.

\* \* \* \* \*